(12) United States Patent
Kurihara et al.

(10) Patent No.: US 11,699,458 B2
(45) Date of Patent: Jul. 11, 2023

(54) ACOUSTIC QUALITY EVALUATION APPARATUS, ACOUSTIC QUALITY EVALUATION METHOD, AND PROGRAM

(71) Applicant: NIPPON TELEGRAPH AND TELEPHONE CORPORATION, Tokyo (JP)

(72) Inventors: Sachiko Kurihara, Tokyo (JP); Noboru Harada, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/608,808

(22) PCT Filed: May 7, 2019

(86) PCT No.: PCT/JP2019/018260
§ 371 (c)(1),
(2) Date: Nov. 4, 2021

(87) PCT Pub. No.: WO2020/225850
PCT Pub. Date: Nov. 12, 2020

(65) Prior Publication Data
US 2022/0277765 A1     Sep. 1, 2022

(51) Int. Cl.
*H04M 3/22* (2006.01)
*G10L 25/69* (2013.01)
*G01S 15/88* (2006.01)

(52) U.S. Cl.
CPC ............ *G10L 25/69* (2013.01); *G01S 15/885* (2013.01); *H04M 3/2236* (2013.01)

(58) Field of Classification Search
CPC .................................................. H04M 3/2236
See application file for complete search history.

(56) References Cited

U.S. PATENT DOCUMENTS

| | | | |
|---|---|---|---|
| 2004/0064760 A1* | 4/2004 | Hicks | H04L 41/5009 714/43 |
| 2006/0029067 A1* | 2/2006 | Conway | H04L 41/50 370/389 |

(Continued)

OTHER PUBLICATIONS

ITU-T (2001) "ITU-T Recommendation P.862: Perceptual evaluation of speech quality (PESQ): An objective method for end-to-end speech quality assessment of narrow-band telephone networks and speech codecs", ITU.

(Continued)

*Primary Examiner* — Feng-Tzer Tzeng

(57) ABSTRACT

To obtain an appropriate evaluation value in an acoustic quality evaluation by a conversational test. An acoustic quality evaluation apparatus 3 evaluates the acoustic quality of a call performed between a near-end terminal 1 and a far-end terminal 2 via a voice communication network 4. An evaluation value presenting unit 31 displays, on a display unit 13, evaluation categories obtained by classifying each of a plurality of evaluation viewpoints into a predetermined number of levels. An input unit 14 transmits the evaluation category selected by the evaluator for each of the evaluation viewpoints, to an evaluation value determination unit 32. The evaluation value determination unit 32 determines the lowest evaluation value among evaluation values assigned to the evaluation category received from the input unit 14 as a subjective evaluation value for acoustic quality.

5 Claims, 4 Drawing Sheets

(56) References Cited

U.S. PATENT DOCUMENTS

2015/0023404 A1* 1/2015 Li .................. H04L 65/612
                                            375/240.02
2015/0199959 A1* 7/2015 Skoglund ........... G10L 25/60
                                            704/239

OTHER PUBLICATIONS

ITU-T (1996) "ITU-T Recommendation P.800: Methods for subjective determination of transmission quality", ITU.

Communication Traffic & Service Quality Project, "Voice Quality Evaluation Method > 3. Subjective Evaluation Method of Voice Quality> 3.5. Equivalent Q value Conversion Method", [online], [Search on Mar. 5, 2019], Internet <URL: http://www.ntt.co.jp/qos/technology/sound/03_5.html> with English translation generated by computer.

* cited by examiner

130 EVALUATION INPUT SCREEN

| 131-1 EASINESS TO HEAR VOICE OF PARTNER | | 131-2 NOISE FEELING | | 131-3 RETURN OF ONE'S OWN VOICE | |
|---|---|---|---|---|---|
| VERY EASY TO HEAR | ● | NO NOISE IS PRESENT | ○ | NO ONE'S OWN VOICE RETURNS | ○ |
| NO PROBLEM TO HEAR | ○ | NOISE IS SLIGHTLY PRESENT | ○ | ONE'S OWN VOICE RETURNS SLIGHTLY | ● |
| SLIGHTLY DIFFICULT TO HEAR | ○ | NOISE IS PRESENT | ● | ONE'S OWN VOICE RETURNS | ○ |
| DIFFICULT TO HEAR | ○ | NOISE IS SIGNIFICANTLY SUPERIMPOSED | ○ | ONE'S OWN VOICE RETURNS LOUDLY | ○ |
| VERY DIFFICULT TO HEAR | ○ | VERY MUCH NOISE IS SUPERIMPOSED | ○ | ONE'S OWN VOICE RETURNS VERY LOUDLY | ○ |
| 132-1 | 133-1 | 132-2 | 133-2 | 132-3 | 133-3 |

ENTER 134

Fig. 3

| EXPERIMENTAL CONDITION | ASSUMED EVALUATION VALUE | EVALUATION VALUE INDEX | EVALUATION VALUE AVERAGE (RELATED ART) | EVALUATION VALUE AVERAGE (EMBODIMENT) |
|---|---|---|---|---|
| I | 4~5 | CONDITION IN WHICH 1 AND 2 ARE NOT ASSIGNED | 4.1 | 4.4 |
| II | 1~2 | CONDITION IN WHICH 4 AND 5 ARE NOT ASSIGNED | 3.3 | 1.4 |
| III | 3~4 | CONDITION IN WHICH 1 IS NOT ASSIGNED | 4.0 | 3.2 |
| IV | 2~3 | CONDITION IN WHICH 5 IS NOT ASSIGNED | 3.5 | 2.1 |

Fig. 4

ACOUSTIC QUALITY EVALUATION APPARATUS, ACOUSTIC QUALITY EVALUATION METHOD, AND PROGRAM

CROSS-REFERENCE TO RELATED APPLICATIONS

This application is a U.S. 371 Application of International Patent Application No. PCT/JP2019/018260, filed on 7 May 2019, the disclosure of which is hereby incorporated herein by reference in its entirety.

TECHNICAL FIELD

The present disclosure relates to techniques for evaluating transmission quality, and particularly to quality evaluation testing techniques for loudspeaker hands-free communication systems.

BACKGROUND ART

With the development of communication technologies, there is an increase in the opportunity to use a loudspeaker hands-free communication system, such as a hands-free call by a conferencing system, a smartphone, and the like, because of the ease with which the call can be made without holding a device. The acoustic echo canceller (AEC) has been used to remove acoustic echoes and ambient noises that act as problems in the loudspeaker hands-free communication system and to provide a comfortable call environment.

Acoustic echoes refer to phenomena in which a voice transmitted from the near end is output from a speaker at a far end and a microphone at the far end picks up the voice. When the effects of the acoustic echo canceller are weak, the acoustic echoes remain uncancelled. When the effects of the acoustic echo canceller are too strong, even the transmitted voice from the far end is removed, and thus the voice is distorted or eliminated and is less likely to be heard. Since the performance of the acoustic echo canceller depends on how precisely the acoustic echo has been removed, the performance evaluation of the acoustic echo canceller in the related art is mainly the objective evaluation focusing on the amount of acoustic echo eliminated. The objective evaluation is easy because the evaluation can be performed by computer processing. However, there has been a problem in that the objective evaluation does not always match the quality experienced by the user (also referred to as "quality of experience") in actual phone calls.

In an IP phone that uses a handset to make calls, the voice transmitted from the far end does not receive an influence of a near-end talker, such as acoustic echoes, and only the voice transmitted from the far end can be evaluated. Thus, it is common for quality evaluation of the IP phone to be performed by a listening test in which the conversational test is simplified and one-way voice is set as the target. The listening test has higher reproducibility and a short conduction time than the conversational test. Thus, the listening test is highly convenient. In addition, objective evaluation methods such as perceptual evaluation of speech quality (PESQ) that estimates the subjective evaluation value by the listening test (also referred to as "listening mean opinion score (listening MOS)") have also been established (see Non Patent Literature 1).

In order to evaluate acoustic echoes or sound processed by the acoustic echo canceller in subjective evaluation, it is necessary to perceive the acoustic echoes, and the evaluation is possible only when an evaluator himself or herself makes a phone call. Thus, in a loudspeaker hands-free communication system, such as hands-free calls and the like, quality evaluation by two-way conversational test has been recommended (see Non Patent Literature 2).

In recent years, call environments with low acoustic quality, such as smartphones and mobile phones, have become widespread. The low acoustic quality means, for example, an acoustic signal having a Q value which is equal to or less than 10 dB. Such an acoustic signal is expected to originally have a MOS value of 1 or 2. The MOS value is normally expressed in five levels of 1 to 5, and the larger value represents higher quality. For the relation between the Q value and the expected MOS value, refer to Non Patent Literature 3.

CITATION LIST

Non Patent Literature

Non Patent Literature 1: ITU-T, "ITU-T Recommendation P.862: Perceptual evaluation of speech quality (PESQ): An objective method for end-to-end speech quality assessment of narrow-band telephone networks and speech codecs", ITU, [R9961]2001

Non Patent Literature 2: ITU-T, "ITU-T Recommendation P.800: Methods for subjective determination of transmission quality", ITU, 1996

Non Patent Literature 3: Communication Traffic & Service Quality Project, "Voice Quality Evaluation Method >3. Subjective Evaluation Method of Voice Quality>3.5. Equivalent Q value Conversion Method", [online], [Search on Mar. 5, 2019], Internet <URL: http://www.n-tt.co.jp/qos/technology/sound/03_5.html>

SUMMARY OF THE INVENTION

Technical Problem

An evaluator who is accustomed to a call environment with low acoustic quality has a low criterion for acoustic quality. Thus, such an evaluator tends to give a high evaluation value, for example, in a case where the voice of the partner can be heard, the acoustic quality is good. Thus, when subjective evaluation is performed in a conversational test in the related art, there is a problem in that there is a bias toward higher evaluation value, and it is not possible to obtain an appropriate evaluation value.

In view of the technical problems described above, an object of the present disclosure is to achieve an acoustic quality evaluation technique capable of obtaining an appropriate evaluation value even by an evaluator who is accustomed to a call environment with low acoustic quality, in an acoustic quality evaluation by a conversational test.

Means for Solving the Problem

To solve the above problem, according to an aspect of the present disclosure, there is provided an acoustic quality evaluation apparatus configured to evaluate acoustic quality of a call performed between a plurality of communication terminals. The acoustic quality evaluation apparatus includes an evaluation value presenting unit configured to present, to an evaluator, evaluation categories obtained by classifying a target evaluation viewpoint of a plurality of evaluation viewpoints into a predetermined number of levels, and an evaluation value determination unit configured to determine a lowest evaluation value among evaluation values assigned to an evaluation category of the evaluation categories selected for each of the plurality of evaluation viewpoints by the evaluator, as a subjective evaluation value of the acoustic quality.

Effects of the Invention

According to the acoustic quality evaluation technique of the present disclosure, it is possible to obtain an appropriate evaluation value even by an evaluator who is accustomed to a call environment having low acoustic quality, in an acoustic quality evaluation by a conversational test.

BRIEF DESCRIPTION OF DRAWINGS

FIG. 3 is a diagram illustrating display contents of an evaluation input screen.

FIG. 4 is a diagram illustrating an experimental result.

DESCRIPTION OF EMBODIMENTS

Figure 1:
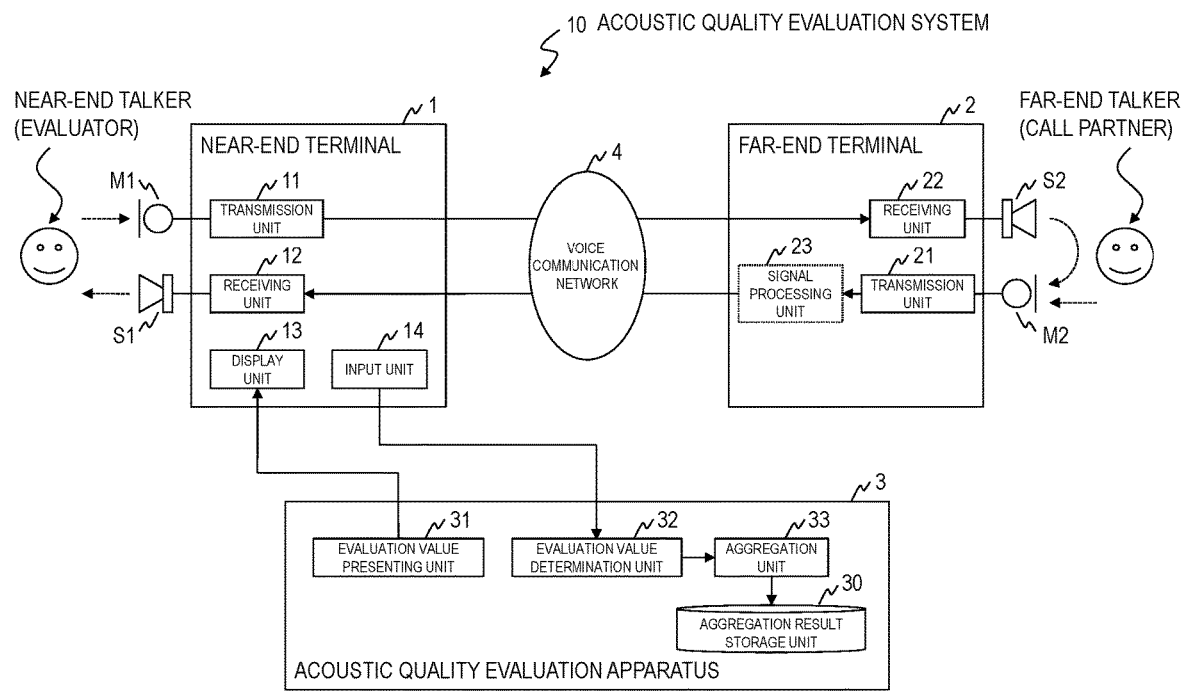
FIG. 1 is a diagram illustrating a functional configuration of an acoustic quality evaluation system.

Hereinafter, an embodiment of the present disclosure will be described in detail. In the drawings, the same reference numerals are given to constituent units that have the same functions and the repeated description will be omitted.

<Conversational Test in Loudspeaker Hands-Free Communication System>

First, an acoustic quality evaluation test by a conversational test in a loudspeaker hands-free communication system will be conceptually described. In the evaluation test, a near-end talker and a far-end talker make a conversation through the loudspeaker hands-free communication system, and an evaluator located on the near-end talker end performs quality evaluation of the loudspeaker hands-free communication system. The loudspeaker hands-free communication system refers to a communication system in which acoustic signals are transmitted and received between terminal devices including a microphone and a speaker and refers to a communication system in which at least a portion of a sound output from the speaker of the terminal device is received by the microphone of the terminal device (system in which sound wraparound occurs). An example of the loudspeaker hands-free communication system is a voice conference system and a video conference system.

In the loudspeaker hands-free communication system, the voice of the near-end talker is received by a microphone on the near-end talker end. An acoustic signal obtained based on the received voice is transmitted to the far-end talker end via a network. A sound represented by the transmitted acoustic signal is output from a speaker on the far-end talker end. In addition, a sound on the far-end talker end is received by a microphone on the far-end talker end. An acoustic signal obtained based on the received sound is transmitted to the near-end talker end via the network. A sound represented by the transmitted acoustic signal is output from a speaker on the near-end talker end. At least a portion of the sound output from the speaker on the far-end talker end is also received by the microphone on the far-end talker end. That is, the sound on the far-end talker end received by the microphone on the far-end talker end is a sound in which wraparound (acoustic echo) of the near-end talker's voice is superimposed on the voice of the far-end talker. That is, the sound on the far-end talker end received by the microphone on the far-end talker end is obtained based on a signal in which a signal based on the voice of the near-end talker is degraded in a space on the far-end talker end and is superimposed on a signal based on the sound of the far-end talker. When the near-end talker is not speaking, the signal based on the voice of the near-end talker is not superimposed, and thus the voice on the far-end talker is not degraded. In addition, the sound on the far-end talker end may be degraded by superimposition of ambient noise on the far-end talker end.

The acoustic signal transmitted to the near-end talker end may be derived from a processing signal obtained by performing predetermined signal processing on a signal representing a sound received by the microphone on the far-end talker end, or may be obtained without performing such signal processing. As the signal processing, any processing may be performed. An example of the signal processing includes processing including at least one of echo cancellation processing or noise cancellation processing. The echo cancellation processing refers to processing by a broad-sense echo canceller for reducing echoes. The processing by the broad-sense echo canceller means the overall processing for reducing echoes. The processing by the broad-sense echo canceller may be implemented, for example, only by a narrow-sense echo canceller using an adaptive filter, may be implemented by an voice switch, may be implemented by echo reduction, may be implemented by a combination of at least some of the above techniques, or may be implemented by a combination of at least some of the above techniques and other techniques (see Reference 1 below). Additionally, the noise cancellation processing refers to processing of suppressing or removing noise components generated around the microphone of the far-end terminal and caused by any environmental noise other than the voice of the far-end talker. The environmental noise refers to, for example, the sound of air conditioning in an office, the interior sound while a car running, the sound of a car passing at an intersection, the sound of insects, the touch sound of a keyboard, and the voices of a plurality of people (babble sound). It does not matter whether the sound is loud or faint, or whether the sound is from indoor or from outdoor (see Reference 2 below).

[Reference 1] Knowledge Base, Group 2-Volume 6-Chapter 5, "Acoustic Echo Canceller", The Institute of Electronics, Information and Communication Engineers, [online], [Search on Mar. 5, 2019], Internet: <URL: http://www.ieice-hbkb.org/files/02/02gun_06 hen_05.pdf>

[Reference 2] SAKAUCHI Sumitaka, HANEDA Yoichi, TANAKA Masashi, SASAKI Junko, and KATAOKA Akitoshi, "An Acoustic Echo Canceller with Noise and Echo Reduction", The Transactions of the Institute of Electronics, Information and Communication Engineers, Vol. J87-A, No. 4, pp. 448-457, April 2004

The evaluator (near-end talker) listens an acoustic signal output from a speaker on the near-end talker end and selects the most suitable evaluation category based on the subjectivity of the near-end talker from among the evaluation categories classified into a predetermined number of levels in advance. For example, in ITU-T Recommendation P. 800 cited in Non Patent Literature 1, a method of classifying the evaluation categories into five levels of "Excellent", "Good", "Fair", "Poor", and "Bad", and assigning evaluation values of 5, 4, 3, 2, and 1 to the evaluation categories in order. The subjective evaluation is performed a plurality of number of times by a plurality of evaluators while the call partners are replaced, and the collected evaluation values are aggregated to evaluate the acoustic quality.

<Acoustic Quality Evaluation System>

Figure 2:
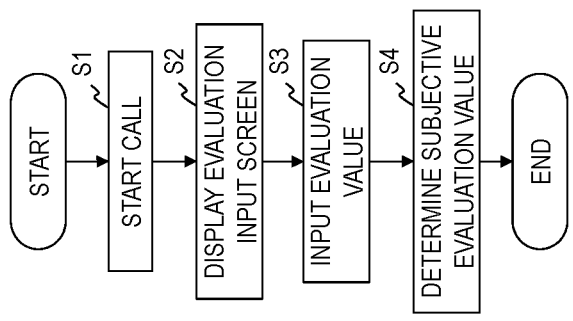
FIG. 2 is a diagram illustrating a processing procedure of an acoustic quality evaluation method.

An acoustic quality evaluation system in the embodiments is an information communication system for performing the above-described conversational test. As illustrated in FIG. 1, an acoustic quality evaluation system 10 in the embodiment includes a near-end terminal 1 used by a near-end talker, a far-end terminal 2 used by a far-end talker, and an acoustic quality evaluation apparatus 3. The near-end terminal 1 includes at least a transmission unit 11, a receiving unit 12, a display unit 13, and an input unit 14. The far-end terminal 2 includes at least a transmission unit 21, a receiving unit 22, and may further include a signal processing unit 23. The acoustic quality evaluation apparatus 3 includes an evaluation value presenting unit 31, an evaluation value determination unit 32, an aggregation unit 33, and an aggregation result storage unit 30. An acoustic quality evaluation method in the embodiment is implemented by the acoustic quality evaluation system 10 performing the processing of each step illustrated in FIG. 2.

In the following description, the near-end talker who uses the near-end terminal 1 is an evaluator who evaluates the acoustic quality, and a far-end talker who uses the far-end terminal 2 is a call partner of a conversation as an evaluation target for acoustic quality. The near-end talker and the far-end talker may simultaneously evaluate the same call. In this case, both the near-end talker and the far-end talker are the evaluators and are the call partners. At this time, the near-end terminal 1 and the far-end terminal 2 have the same functional configuration. The near-end terminal 1 further includes a signal processing unit, and the far-end terminal 2 further includes a display unit and an input unit. In the following description, it is assumed that the acoustic quality of a two-party call between the near-end terminal 1 and the far-end terminal 2 is evaluated. A plurality of far-end terminals 2 may be provided, and a conference call of three or more persons performed between the near-end terminal 1 and a plurality of far-end terminals 2 may be evaluated.

The near-end terminal 1 and the far-end terminal 2 are connected via a voice communication network 4. The acoustic quality evaluation apparatus 3 is connected to the near-end terminal 1 via a network (not illustrated). However, in a case where the voice communication network 4 is capable of logically dividing a communication path for voice and a communication path for data by band control or the like, the near-end terminal 1 may be connected to the acoustic quality evaluation apparatus 3 via the voice communication network 4. The voice communication network 4 is a circuit-switched or packet-switched communication network configured so that the connected devices can communicate with each other, and is configured assuming voice communication in particular. Specifically, the voice communication network 4 may be configured by the Internet, a wide area network (WAN), a local area network (LAN), a dedicated line, a public switched telephone network, a mobile telephone communication network, and the like.

Each of the near-end terminal 1 and the far-end terminal 2 is, for example, a special device configured by loading a special program into a known or dedicated computer including a central processing unit (CPU), a main storage device (random access memory (RAM)), and the like. Each of the near-end terminal 1 and the far-end terminal 2 executes, for example, each processing operation under the control of the central processing unit. Data input to the near-end terminal 1 and the far-end terminal 2 and data obtained in each processing operation are stored, for example, in the main storage device, and the data stored in the main storage device is read out to the central processing unit as needed and used for other processing. At least a portion of the near-end terminal 1 and the far-end terminal 2 may be configured with hardware such as an integrated circuit. Specifically, the near-end terminal 1 and the far-end terminal 2 are mobile terminals such as smartphones and tablets, or information processing devices that include a voice transmission and reception function and a data communication function, such as desktops or laptop personal computers.

For example, the acoustic quality evaluation apparatus 3 is a special device configured by loading a special program into a known or dedicated computer including a central processing unit (CPU), a main storage device (random access memory (RAM)), and the like. For example, the acoustic quality evaluation apparatus 3 executes each processing operation under the control of the central processing unit. Data input to the acoustic quality evaluation apparatus 3 and data obtained in each processing operation are stored, for example, in the main storage device, and the data stored in the main storage device is read out to the central processing unit as needed and used for other processing. At least a portion of the acoustic quality evaluation apparatus 3 may be configured with hardware such as an integrated circuit. Each storage unit included in the acoustic quality evaluation apparatus 3 can be configured by, for example, a main storage device such as a random access memory (RAM), an auxiliary storage device configured by a hard disk, an optical disc, or a semiconductor memory element such as a flash memory, or a middleware such as a relational database or a key-value store. Specifically, the acoustic quality evaluation apparatus 3 is an information processing device that includes a data communication function and a data processing function, such as a desktop type or a rack-mounted type server computer.

In Step S1, the near-end terminal 1 and the far-end terminal 2 start a call as an evaluation target for acoustic quality. First, the near-end terminal 1 makes a call to the far-end terminal 2 in accordance with the operation of the near-end talker. The far-end terminal 2 responds to an incoming call from the near-end terminal 1 in accordance with the operation of the far-end talker. Thus, the call is established between the near-end terminal 1 and the far-end terminal 2. Here, an example in which a call is made from the near-end terminal 1 to the far-end terminal 2 is described, but a call may be established by being made from the far-end terminal 2 to the near-end terminal 1.

When the call is established, the voice spoken by the near-end talker is converted to an acoustic signal by a microphone M1 of the near-end terminal 1. The transmission unit 11 transmits the acoustic signal to the receiving unit 22 of the far-end terminal 2. The receiving unit 22 of the far-end terminal 2 outputs the acoustic signal received from the transmission unit 11 of the near-end terminal 1, from a speaker S2 of the far-end terminal 2. The voice spoken by the far-end talker is converted to an acoustic signal by a microphone M2 of the far-end terminal 2. At this time, the wraparound of the near-end talker's voice, which is output from the speaker S2 of the far-end terminal 2, is superimposed on the voice of the far-end talker and then is converted to an acoustic signal. The transmission unit 21 of the far-end terminal 2 transmits the acoustic signal to the receiving unit 12 of the near-end terminal 1. When the far-end terminal 2 includes the signal processing unit 23, the signal processing unit 23 of the far-end terminal 2 performs signal processing including at least one of echo cancellation processing or noise cancellation processing, on the acoustic signal transmitted to the near-end terminal 1. The receiving unit 12 of the near-end terminal 1 outputs the acoustic signal received from the transmission unit 21 of the far-end terminal 2, from a speaker S1 of the near-end terminal 1. In this manner, the near-end talker and the far-end talker make a conversation via the call established between the near-end terminal 1 and the far-end terminal 2.

In Step S2, the evaluation value presenting unit 31 in the acoustic quality evaluation apparatus 3 transmits a control signal for causing an evaluation input screen, which is provided for causing the near-end talker to input an evaluation for acoustic quality, to be displayed on the display unit 13 of the near-end terminal 1. The display unit 13 of the near-end terminal 1 displays the evaluation input screen in accordance with the received control signal. Evaluation categories classified into a plurality of levels for a plurality of predetermined evaluation viewpoints are displayed on the evaluation input screen. Evaluation values corresponding to the degree of quality in each of the evaluation viewpoint are assigned to the evaluation categories. It is assumed that the evaluation input screen is set so that only one evaluation category can be selected for each of the evaluation viewpoints.

The evaluation viewpoints include, for example, three viewpoints of "easiness to hear a voice of a partner", "noise feeling", and "return of one's own voice". For the evaluation viewpoint of "easiness to hear a voice of a partner", for example, evaluation categories of five levels being "very easy to hear", "no problem to hear", "slightly difficult to hear", "difficult to hear", and "very difficult to hear" are provided, and evaluation values of 5, 4, 3, 2, and 1 are assigned to each evaluation category in order. For the evaluation viewpoint of "noise feeling", for example, evaluation categories of five levels being "no noise is present", "noise is slightly present", "noise is present", "noise is significantly superimposed", and "very much noise is superimposed" are provided, and evaluation values of 5, 4, 3, 2, and 1 are assigned to each evaluation category in order. For the evaluation viewpoint of "return of one's own voice", for example, evaluation categories of five levels being "no one's own voice returns", "one's own voice returns slightly", "one's own voice returns", "one's own voice returns loudly", and "one's own voice returns very loudly" are provided, and evaluation values of 5, 4, 3, 2, and 1 are assigned to each evaluation category in order. The relation between the evaluation viewpoint, the evaluation category, and the evaluation value described in the above example can be summarized as follows.

TABLE 1

| Easiness to hear a voice of a partner | Noise feeling | Return of one's own voice | Evaluation value |
|---|---|---|---|
| Very easy to hear | No noise is present | No one's own voice returns | 5 |
| No problem to hear | Noise is slightly present | One's own voice returns slightly | 4 |
| Slightly difficult to hear | Noise is present | One's own voice returns | 3 |
| Difficult to hear | Noise is significantly superimposed | One's own voice returns loudly | 2 |
| Very difficult to hear | Very much noise is superimposed | One's own voice returns very loudly | 1 |

FIG. 3 illustrates the evaluation input screen for inputting the evaluation based on the evaluation categories in the example described above. On an evaluation input screen 130, an area 131-1 corresponding to the evaluation viewpoint of "easiness to hear a voice of a partner", an area 131-2 corresponding to the evaluation viewpoint of "noise feeling", and an area 131-3 corresponding to the evaluation viewpoint of "return of one's own voice" are provided. In the area 131-1, a label 132-1 representing the evaluation categories obtained by classifying the "easiness to hear a voice of a partner" into five levels is displayed, and five buttons 133-1 are provided for each of the evaluation categories in a one-to-one manner. The button 133-1 has a function to switch the selection state and is set so that only one can be selected in the area 131-1. For example, the button 133-1 is an option button with a group set in the area 131-1. Labels 132-2 and 132-3, and buttons 133-2 and 133-3 are similarly provided for the area 131-2 and the area 131-3, respectively. FIG. 3 illustrates an example of a design of the evaluation input screen. The evaluation input screen may have a different design in view of the convenience of operation and the like.

In Step S3, the near-end talker listens a voice output from the speaker S1 of the near-end terminal 1 and evaluates the acoustic quality of the voice. The evaluation of the acoustic quality is performed by selecting the evaluation category considered to be the most relevant for each evaluation viewpoint based on the subjectivity of the near-end talker, on the evaluation input screen displayed on the display unit 13. In the example of the evaluation input screen 130 in FIG. 3, the most relevant evaluation category for "easiness to hear a voice of a partner" is selected, and the button 133-1 corresponding to the label 132-1 is selected. Similarly, the buttons 133-2 and 133-3 respectively corresponding to the most relevant evaluation category for "noise feeling" and the most relevant evaluation category for "return of one's own voice" are selected. The near-end talker selects the evaluation categories for all evaluation viewpoints, and then presses on an enter button 134. The input unit 14 in the near-end terminal 1 transmits the evaluation values assigned to the selected evaluation categories, to the evaluation value determination unit 32 in the acoustic quality evaluation apparatus 3 in accordance with the selection state in the evaluation input screen 130.

In Step S4, the evaluation value determination unit 32 in the acoustic quality evaluation apparatus 3 determines one subjective evaluation value for acoustic quality based on the evaluation value for each evaluation viewpoint, which is received from the input unit 14 in the near-end terminal 1. Specifically, the lowest evaluation value of the evaluation values for the corresponding evaluation viewpoints is determined to be the subjective evaluation value for acoustic quality. In the example of FIG. 3, since the evaluator selects "very easy to hear" (evaluation value is 5) for "easiness to hear a voice of a partner", "noise is present" (evaluation value is 3) for "noise feeling", and "one's own voice returns slightly" (evaluation value is 4) for "return of one's own voice", the subjective evaluation value is determined to be "3" being the lowest evaluation value. The evaluation value determination unit 32 outputs the determined subjective evaluation value to the aggregation unit 33.

The aggregation unit 33 in the acoustic quality evaluation apparatus 3 aggregates a plurality of subjective evaluation values that have been input from the evaluation value determination unit 32 a plurality of number of times. The aggregation unit 33 stores the aggregation results in the aggregation result storage unit 30. The plurality of subjective evaluation values may be a plurality of subjective evaluation values based on a conversational test which has been performed a plurality of number of times by the same evaluator. The plurality of subjective evaluation values may be a plurality of subjective evaluation values input by a plurality of evaluators in one conversational test or may be a plurality of subjective evaluation values input based on conversational tests which are respectively performed a plurality of number of times by a plurality of evaluators. The aggregation unit 33 may perform, for example, statistical processing such as an average based on the plurality of subjective evaluation values stored in the aggregation result storage unit 30, and store a result of the processing in the aggregation result storage unit 30.

FIG. 4 illustrates an experimental result of the evaluation test performed by the acoustic quality evaluation system in the embodiment. In the test, four experimental conditions I to IV were set, and, under each experimental condition, four evaluators performed a conversational test each three times for four days while the communication partner was switched from the four evaluators. The experimental condition I is a condition in which the sound is clearly good and it is assumed that an evaluation value of 4 or 5 is assigned (in other words, there would be no person assigning the evaluation value of 1 or 2). The experimental condition II is a condition in which the sound is clearly bad and it is assumed that an evaluation value of 1 or 2 is assigned (in other words, there would be no person assigning the evaluation value of 4 or 5). The experimental condition III is a condition in which the sound is relatively good among sounds determined to be fair by many people, and it is assumed that an evaluation value of 3 or 4 is assigned (in other words, there would be no person assigning an evaluation value of 1). The experimental condition IV is a condition in which the sound is relatively bad among sounds determined to be fair by many people, and it is assumed that an evaluation value of 2 or 3 is assigned (in other words, there would be no person assigning an evaluation value of 5). In each of such experimental conditions, a conversational test was performed using the typical evaluation categories ("excellent", "good", "slightly bad", "bad", and "very bad") in the related art and the evaluation category of the embodiment (evaluation categories of five levels for each of the three evaluation viewpoints is set). Then, the average of the evaluation value was aggregated. As illustrated in FIG. 4, in the evaluation categories in the embodiment, it is possible to obtain the evaluation value in a range of the estimated evaluation values, but, in the evaluation category in the related art, in particular, in the experimental conditions II and IV in which the low evaluation value is assumed to be assigned, it can be seen that the higher evaluation value than estimated is assigned. That is, this experiment has demonstrated that the evaluation categories in the embodiment can be used to obtain the appropriate evaluation values even by the evaluator having a tendency to assign a high evaluation value to the evaluation category in the related art.

Although the embodiments of the present disclosure have been described, a specific configuration is not limited to the embodiment, and appropriate changes in the design are, of course, included in the present disclosure within the scope of the present disclosure without departing from the gist of the present disclosure. The various steps of the processing described in the embodiments are not only executed sequentially in the described order but may also be executed in parallel or separately as necessary or in accordance with a processing capability of the device that performs the processing.

[Program and Recording Medium]

When various processing functions in each device described in the foregoing embodiment are implemented by a computer, processing details of the functions that each device should have are described by a program. When the program is executed by a computer, the various processing functions of each device are implemented on the computer.

The program in which the processing details are described can be recorded on a computer-readable recording medium. The computer-readable recording medium can be any type of medium such as a magnetic recording device, an optical disc, a magneto-optical recording medium, and a semiconductor memory.

The program is distributed, for example, by selling, giving, or lending a portable recording medium such as a DVD or a CD-ROM with the program recorded on it. Further, the program may be stored in a storage device of a server computer and the program may be distributed by transferring the program from the server computer to another computer via a network.

For example, a computer executing such a program first stores the program recorded on the portable recording medium or the program transferred from the server computer, once in its own storage device. When processing is executed, the computer reads the program stored in its own storage device and executes the processing in accordance with the read program. As another execution form of the program, the computer may directly read the program from the portable recording medium and execute processing in accordance with the program. Further, each time the program is transferred from the server computer to the computer, the computer executes processing sequentially in accordance with the received program. In another configuration, the processing may be executed through a so-called application service provider (ASP) service in which functions of the processing are implemented just by issuing an instruction to execute the program and obtaining results without transfer of the program from the server computer to the computer. In addition, the program in the present embodiment is assumed to include information which is provided for processing by a computer and is equivalent to a program (data and the like that has characteristics regulating processing of the computer rather than a direct instruction for a computer).

Also, in the present embodiment, the device is configured by executing a predetermined program on a computer. However, at least a part of the processing contents may be implemented by hardware.

REFERENCE SIGNS LIST

10 Acoustic quality evaluation system
1 Near-end terminal
2 Far-end terminal
3 Acoustic quality evaluation apparatus
4 Voice communication network
11 Transmission unit
12 Receiving unit
13 Display unit
14 Input unit
21 Transmission unit
22 Receiving unit
23 Signal processing unit
30 Aggregation result storage unit
31 Evaluation value presenting unit
32 Evaluation value determination unit
33 Aggregation unit

The invention claimed is:

1. An acoustic quality evaluation apparatus configured to obtain, from an evaluator, a subjective evaluation value of acoustic quality of a call performed between a plurality of communication terminals, the apparatus comprising:

processing circuitry configured to: execute
an evaluation value presenting processing configured to present, to the evaluator, evaluation categories obtained by classifying a target evaluation viewpoint of a plurality of evaluation viewpoints into a predetermined number of levels; and
an evaluation value determination processing configured to determine a lowest evaluation value among evaluation values assigned to an evaluation category of the evaluation categories selected for each of the plurality of evaluation viewpoints by the evaluator, as the subjective evaluation value of the acoustic quality.

2. The acoustic quality evaluation apparatus according to claim 1,
wherein the plurality of evaluation viewpoints include at least easiness to hear a voice of a partner, noise feeling, and return of one's own voice, and
regarding the evaluation categories, a degree of quality in each of the plurality of evaluation viewpoints is classified by five levels, and a higher evaluation value is assigned for higher quality.

3. An acoustic quality evaluation method for obtaining, from an evaluator, a subjective evaluation value of acoustic quality of a call performed between a plurality of communication terminals, the method comprising:
presenting, by an evaluation value presenting processing, to the evaluator, evaluation categories obtained by classifying a target evaluation viewpoint of a plurality of evaluation viewpoints into a predetermined number of levels; and
determining, by an evaluation value determination processing, a lowest evaluation value among evaluation values assigned to an evaluation category of the evaluation categories selected for each of the plurality of evaluation viewpoints by the evaluator, as the subjective evaluation value of the acoustic quality.

4. A non-transitory computer-readable storage medium which stores a program for causing a computer to operate as the acoustic quality evaluation apparatus according to claim 1.

5. A non-transitory computer-readable storage medium which stores a program for causing a computer to operate as the acoustic quality evaluation apparatus according to claim 2.

* * * * *